(12) United States Patent
Xie et al.

(10) Patent No.: US 11,275,955 B2
(45) Date of Patent: Mar. 15, 2022

(54) LANE LINE PROCESSING METHOD AND DEVICE

(71) Applicant: Baidu Online Network Technology (Beijing) Co., Ltd., Beijing (CN)

(72) Inventors: Shufu Xie, Beijing (CN); Yuqiang Zhai, Beijing (CN); Tian Xia, Beijing (CN); Yu Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 243 days.

(21) Appl. No.: 16/508,862

(22) Filed: Jul. 11, 2019

(65) Prior Publication Data
US 2020/0074187 A1    Mar. 5, 2020

(30) Foreign Application Priority Data
Sep. 3, 2018 (CN) .......................... 201811019280.5

(51) Int. Cl.
*G06K 9/00* (2006.01)
*G06K 9/46* (2006.01)
*G06K 9/62* (2006.01)

(52) U.S. Cl.
CPC ....... *G06K 9/00798* (2013.01); *G06K 9/4661* (2013.01); *G06K 9/6256* (2013.01)

(58) Field of Classification Search
CPC . G06K 9/00798; G06K 9/4661; G06K 9/6256
See application file for complete search history.

(56) References Cited

U.S. PATENT DOCUMENTS

| 6,504,951 B1 | 1/2003 | Luo |
| 2003/0053686 A1 | 3/2003 | Luo |
| 2006/0015252 A1* | 1/2006 | Yamamoto ............ G01S 17/931 701/301 |

(Continued)

FOREIGN PATENT DOCUMENTS

| CN | 104657727 A | 5/2015 |
| CN | 105260699 | 1/2016 |

(Continued)

OTHER PUBLICATIONS

Wang, Jiton, et al., "Lane Detection Algorithm Based on Density Clustering and RANSAC", College of Communication Engineering Julia University. 6 pages.
Hernandez, Danilo Caceres, et al., "Lane Marking Recognition Based on Laser Scanning", Intelligent Systems Laboratory, Graduate School of Electrical Engineering, University of Ulsan, Ulsan, Korea. 4 pages.
Japanese Search Report dated Oct. 23, 2020 in Japanese Application No. 2018-110192805.

(Continued)

*Primary Examiner* — Qun Shen
(74) *Attorney, Agent, or Firm* — Knobbe, Martens, Olson & Bear, LLP

(57) ABSTRACT

Embodiments of the present application provide a lane line processing method and a lane line processing device. The method can include: performing a binarization processing on a first image to obtain a binary image, the first image including lane line points and non-lane line points; performing a connected domain analysis on the binary image to obtain at least one connected domain in the binary image, the connected domain including a plurality of adjacent lane line points; determining lane line points in a group corresponding to a lane line, based on the connected domain; and obtaining representation information of the lane line corresponding to the group, by using the lane line points in the group.

9 Claims, 4 Drawing Sheets

(56) References Cited

U.S. PATENT DOCUMENTS

| | | | |
|---|---|---|---|
| 2009/0080704 A1* | 3/2009 | Mori | G06K 9/00798 |
| | | | 382/104 |
| 2010/0054538 A1* | 3/2010 | Boon | G06K 9/00798 |
| | | | 382/104 |
| 2013/0177202 A1* | 7/2013 | Dierks | G06K 9/3241 |
| | | | 382/103 |
| 2016/0188984 A1* | 6/2016 | Kawano | G06K 9/00798 |
| | | | 348/148 |
| 2016/0341558 A1* | 11/2016 | Lee | G06K 9/00805 |
| 2017/0140245 A1* | 5/2017 | Kraft | G06K 9/0063 |
| 2017/0236011 A1* | 8/2017 | Lakehal-Ayat | G06K 9/00651 |
| | | | 382/159 |
| 2018/0181817 A1 | 6/2018 | Yan | |

FOREIGN PATENT DOCUMENTS

| | | |
|---|---|---|
| CN | 105261020 A | 1/2016 |
| EP | 1 107 179 A2 | 6/2001 |
| EP | 1 359 543 A2 | 11/2003 |
| EP | 3 171 292 A1 | 5/2017 |
| JP | 2017533482 | 11/2017 |

OTHER PUBLICATIONS

Japanese Office Action dated Sep. 1, 2020 in Japanese Application No. 2019-123675.

Chinese Search Report dated Apr. 21, 2020 for Chinese Patent Application No. 2018110192805. 2 pages.

Hailang Zhan, "The Lance Line Detection and Traffic Sign Recognition Base on Computer Vision", China excellent master's dissertation full text database (Electronic Journal) information technology series, 12 period of 2015.

Guorong Liu, "Researched on Lane Detection and Tracking Algorithm based on Image", Wanfang dissertation database, Apr. 2014, in 76 pages.

Search Report dated Jul. 2, 2019 for Chinese Application No. 2018110192805, 5 pages.

Office Action dated Jul. 18, 2019 for Chinese Application No. 2018110192805, 8 pages.

Hillel, et al., "Recent progress in road and lane detection: a survey," Machine Vision and Application (2014) 25:727-745.

Saha, et al., "Automated Road Lane Detection for Intelligent Vehicles," Global Journal of Computer and Technology, vol. 12, Issue 6 Version 1.0, Mar. 2012, 7 pages.

Extended Search Report dated Jan. 27, 2020 for European Application No. 19186005.5, 7 pages.

* cited by examiner

LANE LINE PROCESSING METHOD AND DEVICE

CROSS-REFERENCE TO RELATED APPLICATION

This application claims priority to Chinese Patent Application No. 201811019280.5, filed on Sep. 3, 2018, which is hereby incorporated by reference in its entirety.

FIELD OF THE DISCLOSURE

The present disclosure relates to the technical field of traffics, and in particular, to a lane line processing method and a lane line processing device.

BACKGROUND OF THE DISCLOSURE

Lane lines play an important role in automatic driving, and can provide important information to be output to modules such as positioning module, decision module and control module. For a two-dimensional (2D) image captured by a camera, the conventional scheme is to use an image processing method to detect the edges of a lane line, and then use clustering or other point-grouping schemes to acquire the lane line.

The schemes using conventional image processing, deep learning and other methods for lane line detection or segmentation from the image require cumbersome post-processing schemes so as to identify the lane line, but the effect of the identification is susceptible to image quality and other conditions. For example, the conventional post-processing schemes may use the Hough transform to derive the lane line, but the conventional post-processing schemes are susceptible to noise points and are not robust.

SUMMARY OF THE DISCLOSURE

Embodiments of the present disclosure provide a lane line processing method and a lane line processing device to solve one or more technical problems in the existing technologies.

In a first aspect, an embodiment of the present disclosure provides a lane line processing method, including:

performing a binarization processing on a first image to obtain a binary image, the first image including lane line points and non-lane line points;

performing a connected domain analysis on the binary image to obtain at least one connected domain in the binary image, the connected domain including a plurality of adjacent lane line points;

determining lane line points in a group corresponding to a lane line, based on the connected domain; and obtaining representation information of the lane line corresponding to the group, by using the lane line points in the group.

In combination with the first aspect, in a first implementation of the first aspect, the embodiment of the present disclosure further includes:

inputting a second image to a deep learning model, to obtain the first image, there being a scaling ratio between the first image and the second image.

In combination with the first aspect, in a second implementation of the first aspect of the embodiment of the present disclosure, the performing a binarization processing on a first image to obtain a binary image includes:

setting brightness values of the lane line points in the first image to be 0, and setting brightness values of the non-lane line points in the first image to be 255; or setting brightness values of the lane line points in the first image to be 255, and setting brightness values of the non-lane line points in the first image to be 0.

In combination with the first aspect, in a third implementation of the first aspect of the embodiment of the present disclosure, the performing a connected domain analysis on the binary image to obtain at least one connected domain in the binary image includes:

performing the connected domain analysis on the binary image in combination with a region of interest, to obtain the at least one connected domains in the region of interest.

In combination with the first aspect, in a fourth implementation of the first aspect of the embodiment of the present disclosure, the determining lane line points in a group corresponding to a lane line, based on the connected domain includes:

determining lane line points of the connected domain in the first image, as lane line points in the group corresponding to the lane line.

In combination with the first aspect, in a fifth implementation of the first aspect of the embodiment of the present disclosure, the obtaining representation information of the lane line corresponding to the group by using the lane line points in the group includes:

mapping coordinates of the lane line points of the group in the first image back to the second image, to obtain coordinates of the lane line points in the group in the second image; and selecting a plurality of lane line points from the group, and performing a polynomial fitting on coordinates of the selected plurality of lane line points in the second image, to obtain a polynomial curve of the lane line corresponding to the group.

In combination with the fifth implementation of the first aspect, in a sixth implementation of the first aspect of the embodiment of the present disclosure, the obtaining representation information of the lane line corresponding to the group, by using the lane line points included in the group further includes:

determining a start point coordinate and/or an end point coordinate of the lane line from the polynomial curve of the lane line.

In a second aspect, an embodiment of the present disclosure provides a lane line processing device, including:

a binarization module, configured to perform a binarization processing on a first image to obtain a binary image, the first image including lane line points and non-lane line points;

a connected domain module, configured to perform a connected domain analysis on the binary image to obtain at least one connected domain in the binary image, the connected domain including a plurality of adjacent lane line points;

a grouping module, configured to determine lane line points in a group corresponding to a lane line, based on the connected domain; and a lane line representing module, configured to obtain representation information of the lane line corresponding to the group, by using the lane line points in the groups.

In combination with the second aspect, in a first implementation of the second aspect, the embodiment of the present disclosure further includes:

an identification module, configured to input a second image to a deep learning model, to obtain the first image, there being a scaling ratio between the first image and the second image.

In combination with the second aspect, in a second implementation of the second aspect of the embodiment of present disclosure, the connected domain module is further configured to perform a connected domain analysis on the binary image in combination with a region of interest, to obtain the at least one connected domain in the region of interest.

In combination with the first implementation of the second aspect, in a third implementation of the second aspect of the embodiment of the present disclosure, the lane line representing module includes:

a mapping sub-module, configured to map coordinates of the lane line points of the group in the first image back to the second image, to obtain coordinates of the lane line points of the group in the second image; and a fitting sub-module configured to select a plurality of lane line points from the group, and perform a polynomial fitting on the coordinates of the selected plurality of lane line points in the second image, to obtain a polynomial curve of the lane line corresponding to the group.

In combination with the third implementation of the second aspect, in a fourth implementation of the second aspect of the embodiment of the present disclosure, the lane line representing module further includes:

a start and end point sub-module, configured to determine a start point coordinate and/or an end point coordinate of the lane line from the polynomial curve of the lane line.

In a third aspect, an embodiment of the present disclosure provides a lane line processing device, the functions of which may be implemented by using hardware or by executing corresponding software by hardware. The hardware or software includes one or more modules corresponding to the functions described above.

In a possible design, the device includes a processor and a memory for storing a program which supports the device in executing the lane line processing method described above, and the processor is configured to execute the program stored in the memory. The device can further include a communication interface for communicating with other devices or communication networks.

In a fourth aspect, an embodiment of the present disclosure provides a computer readable storage medium for storing computer software instructions used for a lane line processing device, the computer readable storage medium including a program involved in executing the lane line processing method described above.

One of the above technical solutions has the following advantages or advantageous effects: by using the connected domain analysis method for grouping the lane line points in the binary image, the obtained groups are accurate, are not susceptible to the image quality, and have high robustness.

Another one of the above technical solutions has the following advantages or advantageous effects: by mapping a group of the binary image back to the original image and then obtaining a lane line curve by fitting, an accurate lane line representation can be obtained, which is also advantageous for accurately determining key information such as the start and end points of the lane line.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION OF THE EMBODIMENT(S) OF THE DISCLOSURE

Hereinafter, only some exemplary embodiments are simply described. As can be appreciated by those skilled in the art, the described embodiments may be modified in various different ways without departing from the spirit or scope of the present disclosure. Accordingly, the drawings and the description should be considered as illustrative in nature instead of being restrictive.

Figure 1:
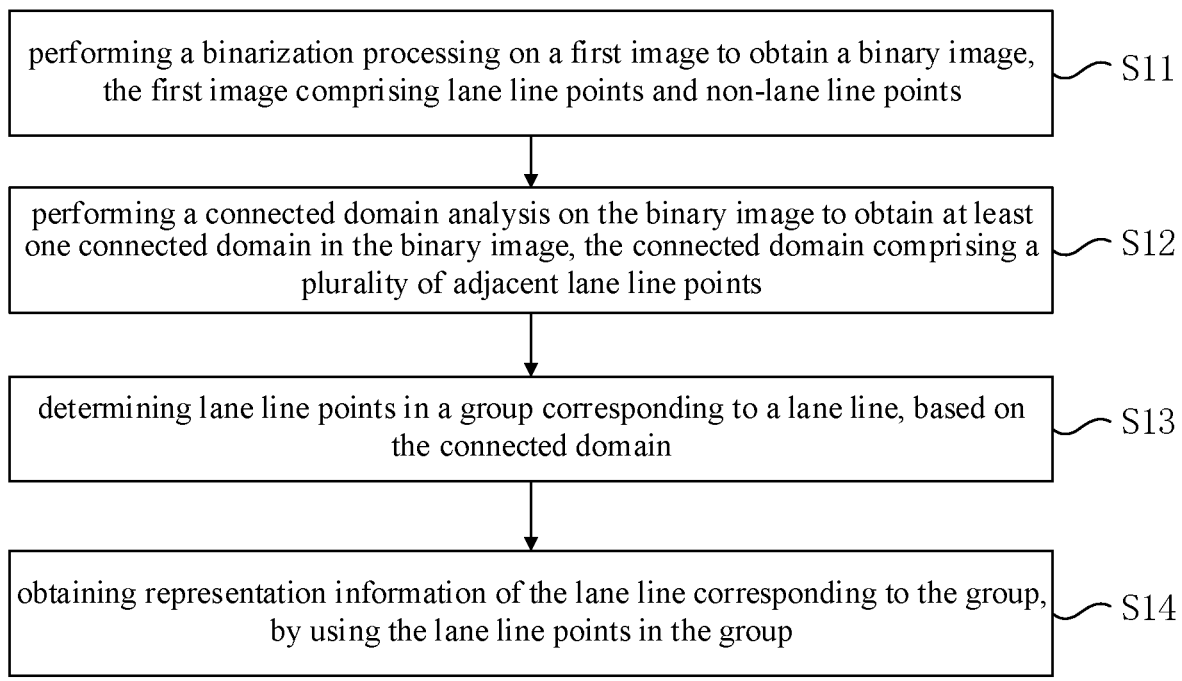
FIG. 1 shows a flowchart of a lane line processing method according to an embodiment of the present disclosure.

FIG. 1 shows a flowchart of a lane line processing method according to an embodiment of the present disclosure. As shown in FIG. 1, the method may include:

Step S11: performing a binarization processing on a first image to obtain a binary image, the first image including lane line points and non-lane line points;

Step S12: performing a connected domain analysis on the binary image to obtain at least one connected domain in the binary image, the connected domain including a plurality of adjacent lane line points;

Step S13: determining lane line points included in a group corresponding to a lane line, based on the connected domain; and Step S14: obtaining representation information of the lane line corresponding to the group, by using the lane line points in the group.

In the present embodiment, pixel points of the first image may include pixel points of lane lines, which may be referred to as lane line points. Pixel points other than the lane line points in the first image may be referred to as non-lane line points. An example of the binarization processing on the first image may include: setting lane line points and non-lane line points in the first image at different brightness values respectively, such that the contrast between the two kinds of points is strong. In the binary image, it is convenient to perform a connected domain analysis. For example, in the binary image, the connected domain analysis is performed according to the brightness values of the lane line points, and the adjacent points with the same or similar brightness values belong to the same connected domain. The adjacent points may include pixel points next to each other in their coordinate positions, and may also include pixel points having a small distance therebetween, e.g., a distance not exceeding a set value. Then, the lane line points in the first image are grouped by using the connected domains. Representation information of a lane line corresponding to a group is obtained by using individual lane line points in the group. The representation information of the lane line may include, but is not limited to, a curve equation, a start point, an end point of the lane line, and so on.

Figure 2:
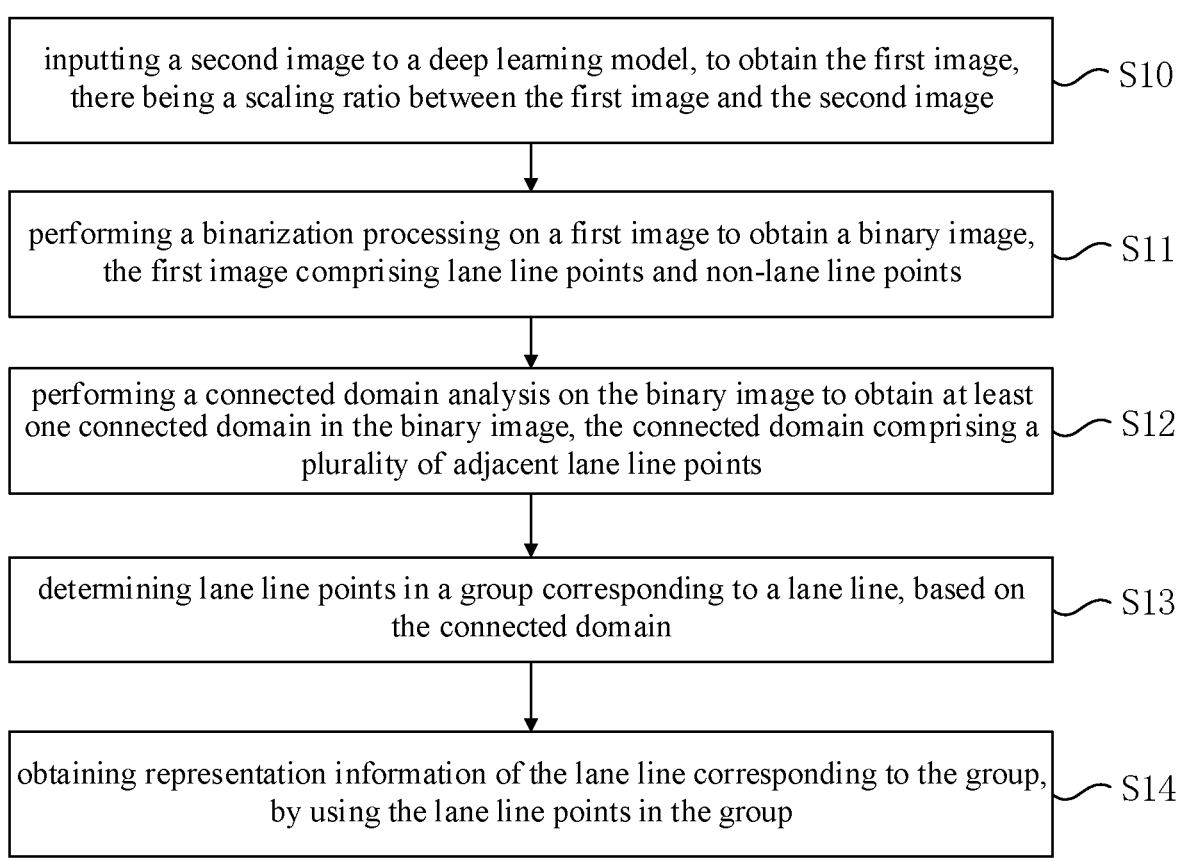
FIG. 2 shows a flowchart of a lane line processing method according to an embodiment of the present disclosure.

In an implementation, as shown in FIG. 2, the method further includes:

Step S10: inputting a second image to a deep learning model, to obtain the first image, there being a scaling ratio between the first image and the second image.

The present embodiment can be used to post-process the prediction result output from the deep learning model. The deep learning model can be constructed by using a neural network, and certain sample images are used for training, so that the deep learning model can obtain a confidence of each of pixel points in the image output from the neural network (i.e., the network output image) belonging to a lane line. A confidence threshold is used for classification. For example, a pixel point whose confidence is greater than the confidence threshold is classified as a lane line point, and a pixel point whose confidence is less than or equal to the confidence threshold is classified as a non-lane line point, etc. Subsequently, the classification result can be also used for continuous self-learning so as to optimize the model.

Figure 3:
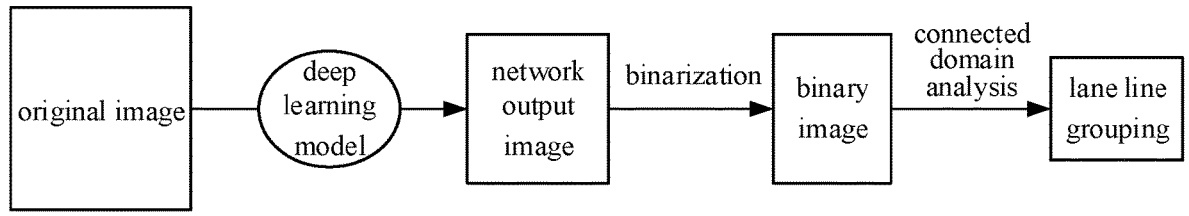
FIG. 3 is a schematic diagram showing post-processing a deep neural network by a lane line processing method according to an embodiment of the present disclosure.

For example, as shown in FIG. 3, a 2D image (original image, i.e., the second image) such as a captured road surface image or the like can be scaled down using the deep learning model, and the pixel points in the scaled-down image are classified into non-lane line points and lane line points (0: non-lane line point; 1: lane line point). For each pixel point that is classified as a lane line point, the model can also give the position of its predicted target point in the network output image (i.e., the first image).

In an implementation, in step S11, the binarization processing on the first image can be performed in various ways, examples of which are given below:

setting brightness values of the lane line points in the first image to be 0, and setting brightness values of the non-lane line points in the first image to be 255; or setting brightness values of the lane line points in the first image to be 255, and setting brightness values of the non-lane line points in the first image to be 0.

Since the size of the network output image is smaller than the original image (for example, the network output image is ¼, ⅛, 1/16 of the original image, etc.), the network output image is binarized according to the set confidence threshold, to obtain a binary image. In one example, the brightness value of each of the pixel points in the binary image may be set to be 0 or 255 according to the classification result of the lane line (for example, whether the confidence of each pixel point exceeds the confidence threshold), so that the entire image only exhibits distinct black and white visual effects. As shown in FIG. 3, the points on the same lane line in the binary image are adjacent to one another and belong to the same connected domain. Therefore, points are grouped according to the connected domains, thus pixels on the same lane line or intersecting lane lines can be grouped into the same group. Finally, using the information such as the coordinates of the lane line points included in each group, the representation information of the lane line corresponding to the group can be obtained.

In an implementation, step S12 may include: performing the connected domain analysis on the binary image in combination with a region of interest, to obtain the at least one connected domain in the region of interest.

Figure 4:
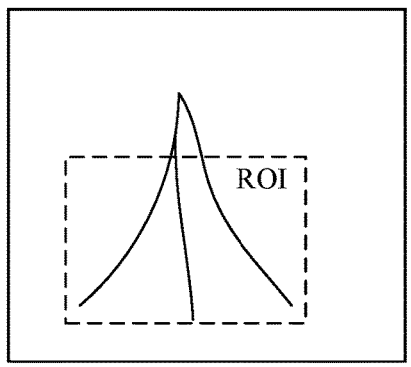
FIG. 4 is a schematic diagram of a lane line processing method according to an embodiment of the present disclosure in combination with a ROI.

Considering that the lane lines may converge together at a distal end, the connected domain analysis can be performed on the binary image in combination with a region of interest (ROI). For example, as shown in FIG. 4, the region surrounded by the broken lines is the ROI. The lane lines meeting at a distal end are separate in the ROI, in which only lane lines that do not intersect are included. In this way, the connected domain analysis is only performed on the pixel points in the ROI, and the lane lines converging at the distal end are separate in the ROI, which can prevent the pixel points located in different lane lines from being grouped into the same group, so that the grouping is more accurate.

The binary image can be combined with the ROI in various ways, examples of which are given below.

In an example, the ROI can be determined in the original image. When the lane line identification is performed on the original image by using the deep learning model, the corresponding ROI in the network output image can be obtained according to the ROI of the original image, and subsequently can be used as the ROI of the binary image.

In another example, the ROI can be determined in the original image. When the lane line identification is performed on the original image by using the deep learning model, the pixels included in the ROI of the original image may be used as the input image. Also, only the pixel points corresponding to the ROI are included in the network output image. Subsequently, the binary image only includes the pixel points corresponding to the ROI.

In another example, instead of determining the ROI in the original image, the ROI is determined in the network output image, and subsequently is used as the ROI of the binary image.

In an implementation, step S13 includes: determining lane line points of the connected domain in the first image, as lane line points in the group corresponding to the lane line.

With reference to the above examples, by combining with the ROI, the lane line points included in the same group can belong to the same lane line to a larger extent.

In an implementation, step S14 includes: mapping coordinates of the lane line points of the group in the first image back to the second image, to obtain coordinates of the lane line points of the group in the second image. For each group, a plurality of lane line points are selected from the group. A polynomial fitting is performed on coordinates of the selected plurality of lane line points in the second image, to obtain a polynomial curve of the lane line corresponding to the group.

In the present embodiment, after performing the connected domain analysis on the binary image to obtain the groups of the lane line points, the coordinates of individual lane line points may also be mapped from the network output image back to the original image. For example, if the network output image is reduced to ⅛ of the original image, the coordinates of the lane line points of each group can be mapped back to the original image by 8 times to obtain the coordinates of these points in the original image. Then, a polynomial curve corresponding to each group is obtained using the polynomial fitting scheme.

An example of the polynomial fitting process includes: assuming that a polynomial $y=ax^3+bx^2+cx+d$ is given. For each group, the coordinates (x, y) of a plurality of (e.g., 4 or more) lane line points included in the group in the original image may be substituted into the polynomial. The polynomial is solved by the least square method, to obtain the values of the coefficients a, b, c, and d in the polynomial.

The given polynomial is only an example rather than being limiting, and other forms of polynomials can be used as required.

In an implementation, step S14 further includes: determining a start point coordinate and/or an end point coordinate of the lane line from the polynomial curve of the lane line.

After a polynomial curve of a lane line corresponding to a certain group is obtained through fitting, information such as the start point and the end point of the lane line can be determined according to the curve. Specifically, in combination with the coordinates of the lane line points in the group and the curve of the lane line corresponding to the group, the start point and the end point information can be determined by using the minimum value and the maximum value of y (and/or x) among these points and the like.

Figure 5:
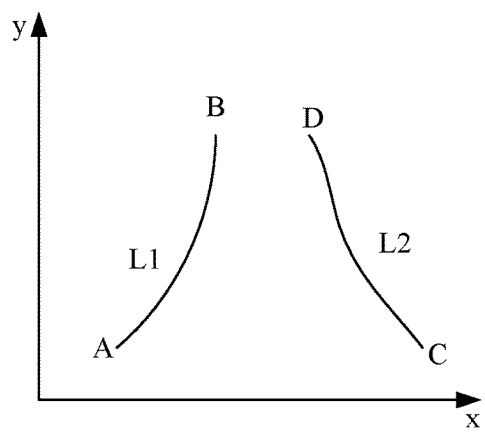
FIGS. 5 and 6 are schematic diagrams showing determinations of start and end points by using a curve in a lane line processing method according to an embodiment of the present disclosure.

For example, as shown in FIG. 5, a curve L1 is obtained by fitting a certain group, wherein the start point coordinate A of L1 is determined using the minimum value of y (and/or x) in the group, and the end point coordinate B of L1 is determined using the maximum value of y (and/or x). A curve L2 is obtained by fitting a certain group, wherein the start point coordinate C of L2 is determined using the maximum value of x (the minimum value of y) in the group, and the end point coordinate D of L2 is determined using the minimum value of x (the maximum value of y) in the group.

Figure 6:
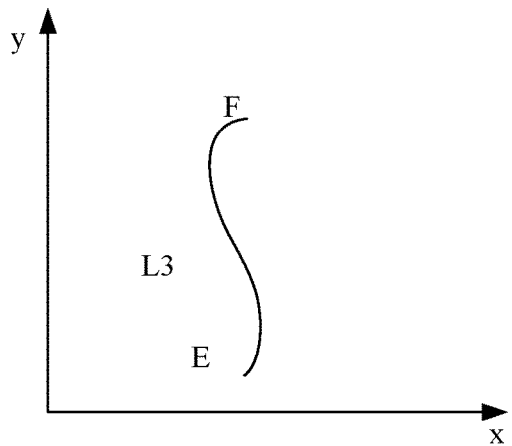

As another example, as shown in FIG. 6, a curve L3 is obtained by fitting a certain group, wherein the start point coordinate E of L3 is determined using the minimum value of y in the group, and the end point coordinate F of L3 is determined using the maximum value of y in the group.

In the embodiments of the present disclosure, the lane line points in the binary image are grouped by using the connected domain analysis method, thus the obtained groups are accurate, are not susceptible to the image quality, and have high robustness.

Further, an accurate lane line representation can be obtained by mapping a group in the binary image back to the original image and then obtaining a curve of a lane line through fitting, which is also advantageous for accurately determining key information such as the start and end points of the lane line.

Figure 7:
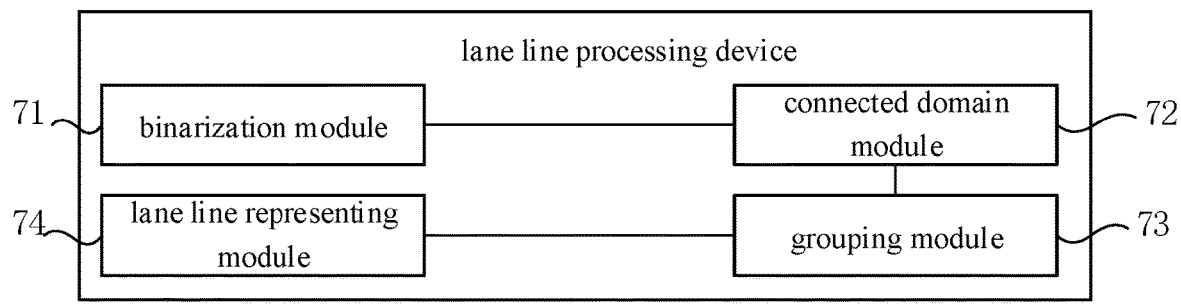
FIG. 7 is a block diagram showing a structure of a lane line processing device according to an embodiment of the present disclosure.

FIG. 7 is a block diagram showing the structure of a lane line processing device according to an embodiment of the present disclosure. As shown in FIG. 7, the device may include:

a binarization module 71, configured to perform a binarization processing on a first image to obtain a binary image, the first image including lane line points and non-lane line points;

a connected domain module 72, configured to perform a connected domain analysis on the binary image to obtain at least one connected domains in the binary image, the connected domain including a plurality of adjacent lane line points;

a grouping module 73, configured to determine lane line points in a group corresponding to a lane line, based on the connected domain; and a lane line representing module 74, configured to obtain representation information of the lane line corresponding to the group, by using the lane line points in the group.

Figure 8:
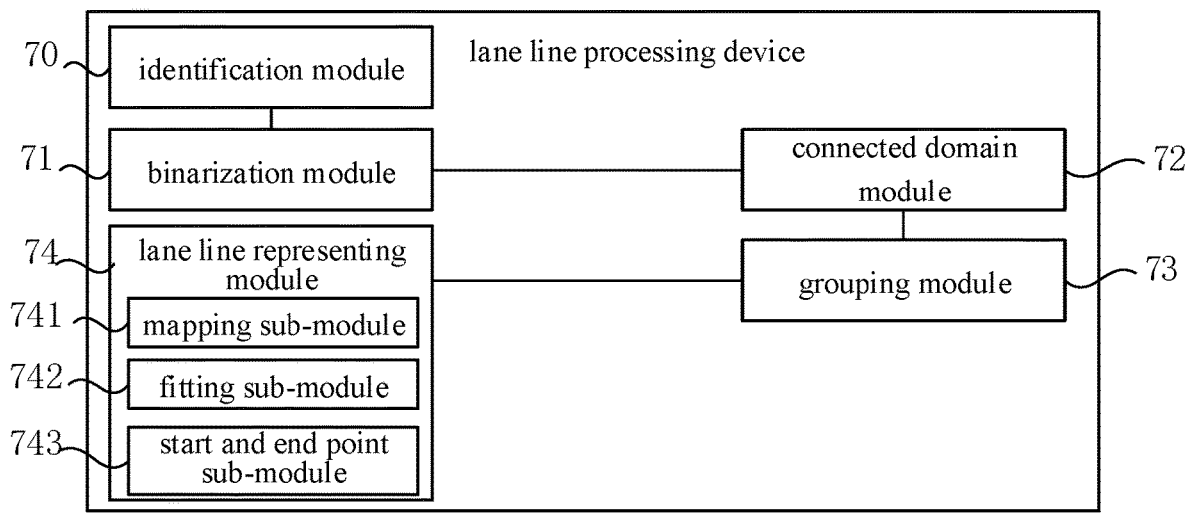
FIG. 8 is a block diagram showing a structure of a lane line processing device according to an embodiment of the present disclosure.

In an implementation, as shown in FIG. 8, the device further includes:

an identification module 70, configured to input a second image to a deep learning model to obtain the first image, there being a scaling ratio between the first image and the second image.

In an implementation, the binarization module 71 is further configured to:

set brightness values of the lane line points in the first image to be 0, and set brightness values of the non-lane line points in the first image to be 255; or set brightness values of the lane line points in the first image to be 255, and set brightness values of the non-lane line points in the first image to be 0.

In an implementation, the connected domain module 72 is further configured to perform the connected domain analysis on the binary image in combination with a region of interest, to obtain the at least one connected domain in the region of interest.

In an implementation, the grouping module 73 is further configured to determine lane line points of the connected domain in the first image, as lane line points in the group corresponding to the lane line.

In an implementation, the lane line representing module 74 includes:

a mapping sub-module 741, configured to map coordinates of the lane line points of the group in the first image back to the second image, to obtain coordinates of the lane line points of the group in the second image; and a fitting sub-module 742, configured to select a plurality of lane line points from the group, and perform a polynomial fitting on coordinates of the selected plurality of lane line points in the second image, to obtain a polynomial curve of the lane line corresponding to the group.

In an implementation, the lane line representing module 74 further includes:

a start and end point sub-module 743, configured to determine a start point coordinate and/or an end point coordinate of the lane line from the polynomial curve of the lane line.

For the functions of various modules in the devices according to embodiments of the present disclosure, please refer to the corresponding description of the above described method, and a repeated description is not given herein.

Figure 9:
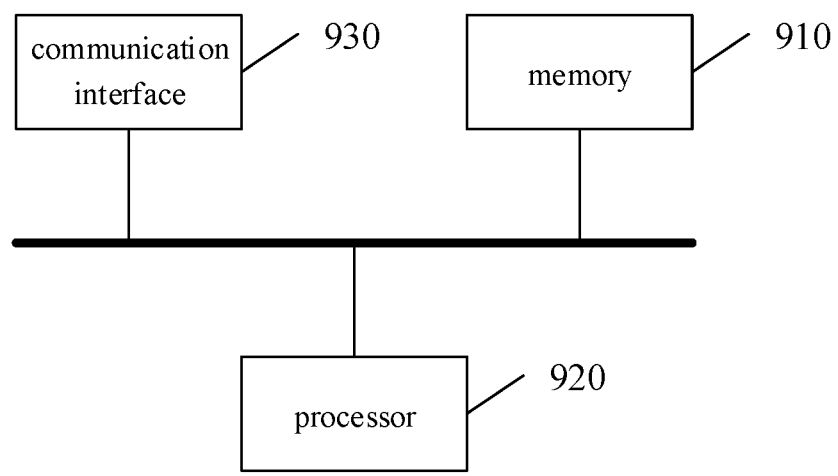
FIG. 9 is a block diagram showing a structure of a lane line processing device according to an embodiment of the present disclosure.

FIG. 9 is a block diagram showing the structure of a lane line processing device according to an embodiment of the present disclosure. As shown in FIG. 9, the device includes a memory 910 and a processor 920, wherein a computer program that can run on the processor 920 is stored in the memory 910. The processor 920 executes the computer program to implement the lane line processing method according to the above embodiment. The number of the memory 910 and the processor 920 may each be one or more.

The device further includes:

a communication interface 930, configured to communicate with an external device to perform data interaction and transmission.

The memory 910 may include a high-speed RAM memory, or may also include a non-volatile memory, such as at least one disk memory.

If the memory 910, the processor 920 and the communication interface 930 are implemented independently, the memory 910, the processor 920 and the communication interface 930 may be connected to one another via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus and so on. For ease of illustration, only one bold line is shown in FIG. 9 to represent the bus, but it does not mean that there is only one bus or only one type of bus.

Optionally, in a specific implementation, if the memory 910, the processor 920 and the communication interface 930 are integrated on one chip, then the memory 910, the processor 920 and the communication interface 930 can complete mutual communication through an internal interface.

An embodiment of the present disclosure provides a computer readable storage medium having a computer program stored thereon which, when executed by a processor, implements the method described in any of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the present disclosure. Moreover, the specific features, structures, materials, or characteristics described may be combined in a suitable manner in any one or more of the embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of some embodiments of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing particular logical functions or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowcharts or otherwise described herein for example may be considered as an ordered list of executable instructions for implementing logical functions. They can be specifically embodied in any computer readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of some embodiments of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer readable storage medium if it is implemented in the form of a software function module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A lane line processing method, comprising:
   performing a binarization processing on a first image to obtain a binary image, the first image comprising lane line points and non-lane line points;
   performing a connected domain analysis on the binary image to obtain at least one connected domain in the binary image, the connected domain comprising a plurality of adjacent lane line points;
   determining a plurality of lane line points in a group corresponding to a lane line, based on the connected domain; and
   obtaining representation information of the lane line corresponding to the group, by using the plurality of lane line points in the group,
   wherein the method further comprises:
      inputting a second image to a deep learning model, to obtain the first image, there being a scaling ratio between the first image and the second image, and
   wherein the obtaining representation information of the lane line corresponding to the group by using the plurality of lane line points in the group comprises:
      mapping coordinates of the lane line points of the group in the first image back to the second image, to obtain coordinates of the lane line points of the group in the second image; and
      selecting a plurality of lane line points from the group, and performing a polynomial fitting on coordinates of the selected plurality of lane line points in the second image, to obtain a polynomial curve of the lane line corresponding to the group.

2. The lane line processing method of claim 1, wherein the performing a binarization processing on a first image to obtain a binary image comprises:
   setting brightness values of the lane line points in the first image to be 0, and setting brightness values of the non-lane line points in the first image to be 255; or
   setting brightness values of the lane line points in the first image to be 255, and setting brightness values of the non-lane line points in the first image to be 0.

3. The lane line processing method of claim 1, wherein the performing a connected domain analysis on the binary image to obtain at least one connected domain in the binary image comprises:
   performing the connected domain analysis on the binary image in combination with a region of interest, to obtain the at least one connected domain in the region of interest.

4. The lane line processing method of claim 1, wherein the determining a plurality of lane line points in a group corresponding to a lane line, based on the connected domain comprises:
   determining lane line points of the connected domain in the first image, as lane line points in the group corresponding to the lane line.

5. The lane line processing method of claim 1, wherein the obtaining representation information of the plurality of lane lines corresponding to the group, by using the lane line points in the group further comprises:
   determining a start point coordinate and/or an end point coordinate of the lane line from the polynomial curve of the lane line.

6. A lane line processing device, comprising:
   one or more processors; and
   a storage device configured to store one or more programs, that, when executed by the one or more processors, cause the one or more processors to:
   perform a binarization processing on a first image to obtain a binary image, the first image comprising lane line points and non-lane line points;
   perform a connected domain analysis on the binary image to obtain at least one connected domain in the binary image, the connected domain comprising a plurality of adjacent lane line points;
   determine a plurality of lane line points in a group corresponding to a lane line, based on the connected domain; and
   obtain representation information of the lane line corresponding to the group, by using the plurality of lane line points in the group,
   wherein the one or more programs, when executed by the one or more processors, further cause the one or more processors to:
      input a second image to a deep learning model, to obtain the first image, there being a scaling ratio between the first image and the second image, and
   wherein the one or more programs, when executed by the one or more processors, further cause the one or more processors to:
      map coordinates of the lane line points of the group in the first image back to the second image, to obtain coordinates of the lane line points of the group in the second image; and
      select a plurality of lane line points from the group, and perform a polynomial fitting on coordinates of the selected plurality of lane line points in the second image, to obtain a polynomial curve of the lane line corresponding to the group.

7. The lane line processing device of claim 6, wherein the one or more programs, when executed by the one or more processors, cause the one or more processors further to:
   perform the connected domain analysis on the binary image in combination with a region of interest, to obtain the at least one connected domain in the region of interest.

8. The lane line processing device of claim 6, wherein the one or more programs, when executed by the one or more processors, cause the one or more processors further to:
   determine a start point coordinate and/or an end point coordinate of the lane line from the polynomial curve of the lane line.

9. A non-transitory computer readable storage medium, in which a computer program is stored, wherein the program, when executed by a processor, causes the processor to implement the method of claim 1.

* * * * *